July 6, 1948. P. SIEVER 2,444,856
TIRE DEFLATION INDICATOR
Filed May 23, 1947
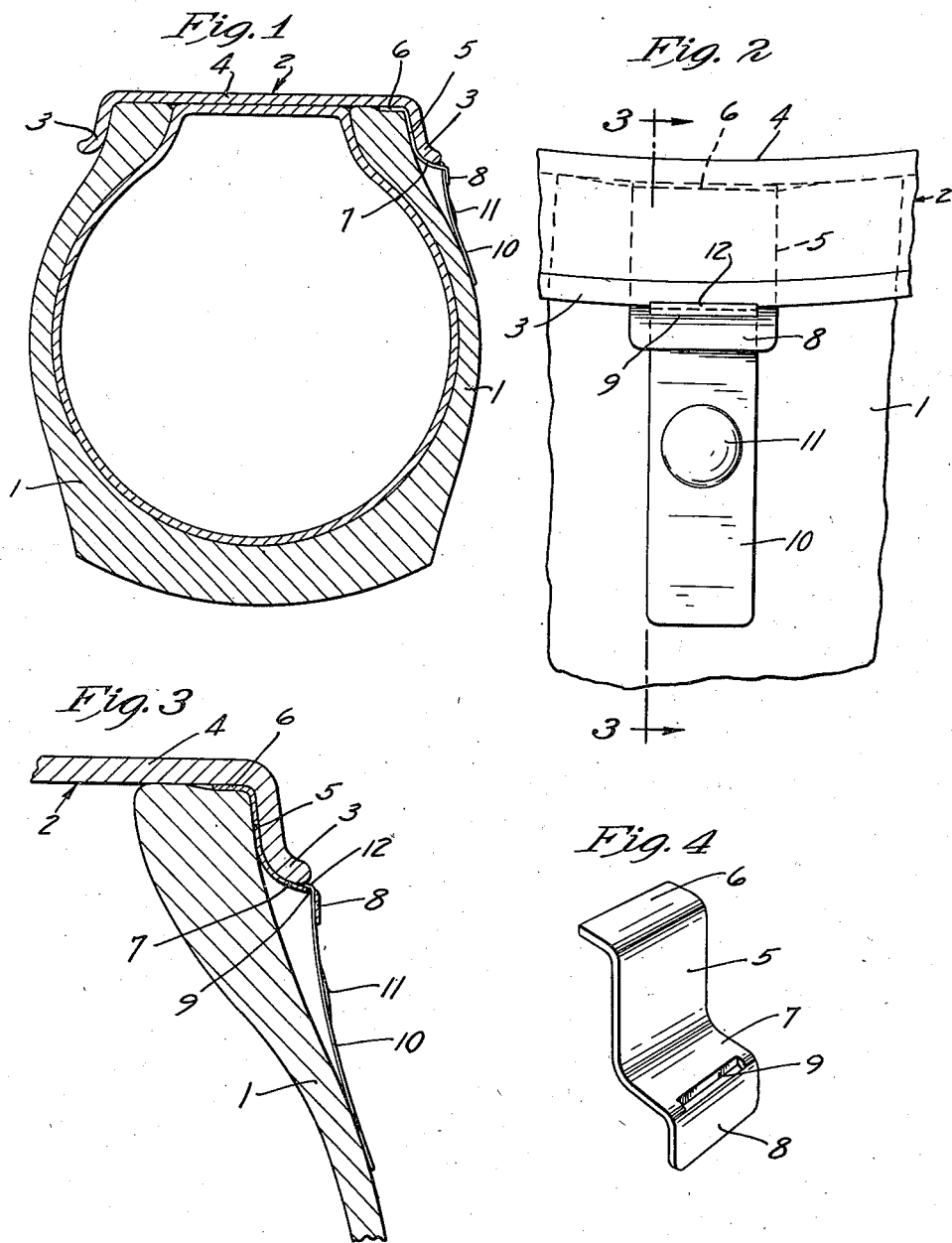
Inventor
Paul Siever
By his Attorneys
Merchant & Merchant Patented July 6, 1948

2,444,856

UNITED STATES PATENT OFFICE 2,444,856

TIRE DEFLATION INDICATOR

Paul Siever, Minneapolis, Minn.

Application May 23, 1947, Serial No. 750,085

2 Claims. (Cl. 116—34)

My invention relates to improvements in deflation-indicating devices for pneumatic tires and more particularly to structures of this type utilizing a metallic sound-producing tongue or "clicker."

The primary object of my invention is the provision of a structure which makes possible easy replacement of the sound-producing tongue or element without replacement of the anchoring means therefor, or without deflation of the tire.

Another object of my invention is the provision of a structure of the above type which can be manufactured at a minimum of cost, which is easy to install and replace, and which is durable in use.

Another object of my invention is the provision of a tire deflation indicator, which is so light in weight that it will not tend to upset the balance of the tire-equipped wheel to which it is secured, irrespective of whether one or more are used thereon.

The above and still other objects of my invention will become apparent from the following detailed specification, appended claims, and attached drawings.

Referring to the drawings wherein like characters indicate like parts throughout the several views:

Fig. 1 is a sectional view of the rim-equipped pneumatic tire, my device in side elevation;

Fig. 2 is an enlarged fragmentary front elevation of the structure, illustrated in Fig. 1;

Fig. 3 is a fragmentary view corresponding somewhat to Fig. 1, but taken on the line 3—3 of Fig. 2; and Fig. 4 is a perspective view of the member for anchoring the sound-producing tongue or element.

Referring with greater particularity to the drawings, the numeral 1 indicates a pneumatic tire which is mounted on a rim 2 having spaced outturned tire bead-engaging flanges 3 and an axially straight body portion 4. The rim may be of any type, including the drop center type, and is more or less diagrammatically illustrated.

An anchoring device or member having a generally radially disposed body portion 5 intermediate the rim flange 3 and the bead portion of the tire 1, is preferably provided at its radially inner end with an inturned foot 6 which is held between the bead of the tire 1 and the axially straight body portion 4 of the rim 2. The intermediate portion of the anchoring member is laterally offset, as indicated by the numeral 7, and underlies or is adjacent to the radially outer surface of the rim flange 3, as indicated particularly in Figs. 1 and 3. As shown, the offset portion 7 extends axially outwardly beyond the rim flange 3 and terminates in a generally radially outwardly-extended lip 8.

As shown particularly in Figs. 2 and 4, the portion 7 of the anchoring member is provided with a transversely extended, preferably closed end slot 9, which is immediately adjacent to the lip 8. It will be noted, particularly by reference to Fig. 3, that the slot 9 is positioned axially outwardly with respect to the side edge of rim flange 3, so as to permit insertion in a radially outward direction therethrough of an elongated conventional sound-producing tongue or clicker element 10 which is dished, as at 11, to make possible the production of sound or clicking noises when the tongue 10 is flexed beyond a given point. At its radially inner end, the tongue 10 is provided with an angularly-disposed foot 12 which is adapted to rest between the offset portion 7 of the anchoring member and the radially outer extremity of the rim flange 3, thus preventing accidental removal of the tongue 10 in a radially inward direction. The foot 12 is of such length so as to prevent its being pulled through the slot 9 in a radially outward direction. The tongue 10 is thus held against accidental movement in either direction.

The resilient nature of the tongue 10 will permit its being flexed sufficiently so that it may be inserted through the slot 9 in a radially outward direction with respect to the tire 1 and rim 2, so that replacement of the tongue in the event of breakage thereof is very easily accomplished. The slot 9 is of sufficient width to allow the passage of the dished portion 11 of the tongue 10 therethrough, but will prevent passage therethrough of the foot 12. It will be seen, particularly with reference to Figs. 1 and 3, that when the tongue 10 is in position for operation on the tire, it is held against the tire in a partially flexed position, wherein the radially outer end of the tongue 10 exerts a yielding bias upon the side wall of the tire 1. This initial flexed condition is insufficient to cause the tongue 10 to click upon rotation of the tire except when the tire 1 is partially deflated. Of course, when the tire 1 is in a partially deflated condition, rotation thereof will cause the tongue 10 to flex sufficiently to produce a clicking sound, thus warning the operator of the vehicle of the partially inflated condition of the tire 1.

My invention has been thoroughly tested and found to be adequate for the accomplishments of the objects above set forth.

While I have shown a preferred embodiment of my invention, it will be understood that the same is capable of modification without departure from the spirit of the invention.

What I claim is:

1. A tire deflation indicator comprising, an anchoring member adapted to be interposed between the bead portion of a tire and the flange of a rim mounting said tire, said member having a laterally offset intermediate portion adjacent the radially outer surface of said flange and terminating in a generally radially outwardly disposed lip, a laterally extended slot in said offset portion adjacent said lip, and a sound producing tongue projecting radially outwardly through said slot with its outer end pressing against the side wall of the tire, said tongue being provided at its radially inner end with an angularly disposed foot adapted to engage the rim flange, and securing said tongue in said slot against accidental removal in a radially outward direction.

2. In a device of the class described, a sound-producing tongue, means for anchoring said tongue to the flange of a tire-supporting rim, said means including a portion underlying the radially outer edge of the rim flange and terminating in a generally radially outwardly-disposed lip, and a laterally-extended slot in said offset portion adjacent said lip, said tongue projecting radially outwardly through said slot with its outer end pressing against the side wall of the tire and being provided at its radially inner end with an angularly-disposed foot adapted to engage the rim flange and secure said tongue in said slot against accidental removal in a radially outward direction, said slot being spaced axially outwardly with respect to the rim flange, whereby to allow insertion of the upper portions of said tongue therethrough.

PAUL SIEVER.

REFERENCES CITED

The following references are of record in the file of this patent:

UNITED STATES PATENTS

| Number | Name | Date |
| --- | --- | --- |
| 1,409,360 | Clarke | Mar. 14, 1922 |